(12) United States Patent
Jarvis et al.

(10) Patent No.: US 9,353,281 B2
(45) Date of Patent: May 31, 2016

(54) NEAR INFRARED ABSORBERS

(75) Inventors: Anthony Jarvis, Cheshire (GB); Martin Walker, Cheshire (GB); Chris Wyres, Cheshire (GB)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 14/118,837

(22) PCT Filed: May 23, 2012

(86) PCT No.: PCT/EP2012/059574
§ 371 (c)(1),
(2), (4) Date: Dec. 2, 2013

(87) PCT Pub. No.: WO2012/160084
PCT Pub. Date: Nov. 29, 2012

(65) Prior Publication Data
US 2014/0099267 A1    Apr. 10, 2014

(30) Foreign Application Priority Data

May 25, 2011 (SE) ....................... 1100419
Dec. 30, 2011 (SE) ....................... 1151297

(51) Int. Cl.
C09D 11/00 (2014.01)
B41M 5/52 (2006.01)
C09D 11/50 (2014.01)
C09D 11/037 (2014.01)
B41M 5/327 (2006.01)
B41M 5/333 (2006.01)

(52) U.S. Cl.
CPC ............. *C09D 11/50* (2013.01); *B41M 5/5218* (2013.01); *C09D 11/037* (2013.01); *B41M 5/3275* (2013.01); *B41M 5/3333* (2013.01); *B41M 2205/04* (2013.01); *Y10T 428/24934* (2015.01); *Y10T 428/31989* (2015.04); *Y10T 428/31993* (2015.04); *Y10T 442/20* (2015.04)

(58) Field of Classification Search
CPC .......... Y10T 428/24934; B41M 5/333; B41M 5/5218; B41M 2205/04; B41M 5/3275; C09D 11/50; C09D 11/37
See application file for complete search history.

(56) References Cited

U.S. PATENT DOCUMENTS

2007/0269740 A1    11/2007  Blank et al.

FOREIGN PATENT DOCUMENTS

| CN | 101316906 A | | 6/2007 |
| CN | 101834009 | * | 9/2010 |
| WO | WO 2006/108745 A1 | | 10/2006 |
| WO | WO 2007/060133 A1 | | 5/2007 |
| WO | WO 2007/141552 A1 | | 12/2007 |
| WO | WO 2010/029276 A1 | | 3/2010 |
| WO | WO 2010/029331 A2 | | 3/2010 |
| WO | WO 2010/112940 A1 | | 10/2010 |

OTHER PUBLICATIONS

Cao et al., CN 101834009, published: Sep. 2010, English Machine Translation accessed on Feb. 22, 2015.*

* cited by examiner

*Primary Examiner* — Ali Soroush
*Assistant Examiner* — Genevieve S Alley
(74) *Attorney, Agent, or Firm* — Finnegan, Henderson, Farabow, Garrett & Dunner LLP

(57) ABSTRACT

An ink formulation having a marking component and a reduced indium tin oxide (r-ITO) is disclosed. The r-ITO in powder form exhibits a lightness (L*), according to the 1976 CIE (L*, a*, b*) space, of not more than 50.

22 Claims, 4 Drawing Sheets

NEAR INFRARED ABSORBERS

CROSS-REFERENCE TO RELATED APPLICATIONS

This is a U.S. National Phase of PCT/EP2012/059574, filed May 23, 2012, which claims the benefit of priority to Swedish Patent Application No. 1100419-9, filed May 25, 2011 and Swedish Patent Application No. 1151297-7, filed Dec. 30, 2011, both of which are incorporated herein by reference.

FIELD OF THE INVENTION

The present invention relates to ink formulations comprising reduced indium tin oxide and a marking component for use in marking applications, e.g. imaging of substrates. Further, it relates to use of reduced indium tin oxide in marking applications and to a method of marking substrates, such as packaging materials.

BACKGROUND

Various proposals have been made for achieving effective marking of substrate, by causing a change of color in or on the substrate, on which the marking is to appear. Further, as indicated below, various thermochromic marking components, i.e. activatable pigments, have been proposed, which may be used to mark a substrate upon application of energy, typically laser energy, i.e. heat.

WO 02/01250 discloses the use of oxymetal salts, such as ammonium octamolybdate (AOM), as marking component in laser marking. AOM is an example of a marking component that can be marked directly with 10,600 nm laser radiation. Laser radiation having a wavelength of about 10 μm may for example be obtained by use of mid-IR $CO_2$ lasers with an emission wavelength in the range 10,000 nm to 12,000 nm. However, mid-IR $CO_2$ lasers are less suitable for installation into existing production lines due to their physical bulk size.

Leuco dyes are marking components that are colorless in one form, but may change into a colored form when exposed to a particular stimulus. Most leuco dyes respond to changes in pH, typically being colorless under alkaline conditions but becoming colored in an acidic environment. Leuco dyes responding to changes in pH, i.e. halochromic leuco dyes, are typically used in combination with a thermal acid generator (TAG). Upon application of heat, the TAG releases protons, thereby the pH is lowered and the halochromic leuco dye is converted into its colored form to provide a marking. A well known TAG is benzylhydroxybenzoate. Other examples of TAG:s are amine neutralized alkylaromatic sulphonic acids, cf. WO 2010/029331, and amine salts of organic silicon or boron compounds, cf. WO 2006/108745. Similar to AOM, also substrates coated with TAG/Leuco dyes may be marked directly with 10,600 nm laser radiation.

An NIR fiber laser may have a small print-head fitted to the production line, connected to the laser, several meters away, via an umbilical cord. Thus, the disadvantage or mid-IR $CO_2$ lasers, being less suitable for installation into existing production lines due to their physical bulk size, may be overcome by use of a NIR (near infra-red) laser and by addition of a NIR-absorber to the ink formulation. The NIR-absorber will absorb near infra-red laser irradiation and convert it into conductive heat. Thus, ink formulations comprising a marking component, e.g. AOM or a Leuco dye and a TAG, and a NIR-absorber may be marked by use of a NIR-laser instead of a mid-IR laser. A common example of a NIR-laser is Nd:YAG laser.

Various types of NIR-absorbers are known within the art and examples of NIR-absorbers in the art comprise:

Organic dye/pigment types. Examples of such MR-absorbers are for example disclosed in U.S. Pat. No. 6,911,262 and WO 2008/050153;

Stoichiometric inorganic pigment types, such as Copper salts, eg. copper (II) hydroxyl phosphate. Examples of this type of NIR-absorbers are disclosed in WO 2005/068207; and Conductive polymers. Conductive polymers are materials that, in the polymerized state, comprise linked monomers (typically rings) that are conjugated and which can therefore allow delocalisation/conduction of positive or negative charge. Examples his type of NIR-absorbers are disclosed in WO 2005/012442

Further examples of NIR-absorbers are disclosed in WO 2005/012442, WO 2005/068207, WO 2007/141522 and WO 2008/050153.

A preferred type of NIR-absorber is disclosed in WO 2007/141522. In said publication various types of non-stoichiometric inorganic pigment types are disclosed. Non-stoichiometric refers to the fact that the ratio of elements in the compound may not be represented by integers. A preferred example of non-stoichiometric inorganic NIR-absorber is reduced indium tin oxide (r-ITO).

According to WO 2007/141522, r-ITO, e.g. in the form of a nanopowder, may act as a highly effective absorber of near infra-red radiation in the region 900 to 2500 nm. Thus, it may be incorporated in an ink formulation comprising a marking components, such as AOM or a Leuco dye and a TAG, which upon exposure to radiation in the near infrared region of the electromagnetic spectrum (780 to 2500 nm), provides a color marking, such as black color marking.

However, there is still a need within the art for further improving the printability of ink formulations comprising NIR-absorbers.

SUMMARY

Consequently, the present invention seeks to mitigate, alleviate, eliminate or circumvent one or more of the above-identified deficiencies in the art and disadvantages singly or in any combination by providing ink formulation comprising a marking component and reduced indium tin oxide (r-ITO), which r-ITO in powder form exhibits a lightness (L*), according to the 1976 CIE (L*, a*, b*) space, of not more than 50. By using reduced indium tin oxide(r-ITO) with such a lightness (L*) in ink formulations, it has been found that coated substrates with improved printability may be obtained.

A further aspect of the invention relates to a substrate coated with an ink formulation comprising a marking component and reduced indium tin oxide (r-ITO), which r-ITO in powder form exhibits a lightness (L*), according to the 1976 CIE (L*, a*, b*) space, of not more than 50.

A further aspect of the invention relates to a liquid food packaging material comprising an innermost thermoplastic layer, to be in contact with the liquid food, a substrate coated with an ink formulation comprising a marking component and reduced indium tin oxide (r-ITO), which r-ITO in powder form exhibits a lightness (L*), according to the 1976 CIE (L*, a*, b*) space, of not more than 50, and a barrier material, arranged between the innermost thermoplastic layer and the substrate. Further, the substrate is covered by a thermoplastic polymer layer in a manner such that the ink formulation is situated between the substrate and the thermoplastic polymer layer and/or in the thermoplastic polymer layer. The thermoplastic polymer layer of the substrate is the outermost layer of the liquid food packaging material.

A further aspect of the invention relates a liquid food package comprising, a liquid food packaging material as described herein.

A further aspect of the invention relates to a method for marking a substrate coated with an ink formulation comprising a marking component and reduced indium tin oxide (r-ITO), which r-ITO in powder form exhibits a lightness ($L^*$), according to the 1976 CIE ($L^*$, $a^*$, $b^*$) space, of not more than 50. In such a method, those parts of the coated substrate, where a marking is intended, is irradiated in order to generate a marking.

An even further aspect of the invention relates to use of reduced indium tin oxide (r-ITO), which r-ITO in powder form exhibits a lightness ($L^*$), according to the 1976 CIE ($L^*$, $a^*$, $b^*$) space, of not more than 50, in laser marking applications.

Further advantageous features of the invention are defined in the dependent claims. In addition, advantageous features of the invention are elaborated in embodiments disclosed herein.

DETAILED SUMMARY OF PREFERRED EMBODIMENTS

The present inventors have found that the lightness of reduced indium tin oxide is of importance for the marking properties, i.e. the markability or imageability, of ink formulations comprising reduced indium tin oxide and a marking component. Marking properties or markability may be regarded as the optical density for a marking or image obtainable with certain amount of the ink formulation at a given fluence. Use of ink formulations comprising a marking component and reduced indium tin oxide, which in powder form exhibits a lightness ($L^*$), according to the 1976 CIE ($L^*$, $a^*$, $b^*$) space, of not more than 50, for coating substrate, has been found to provide coated substrate with good marking properties. Further, it has been shown that use of reduced indium tin oxide, which in powder form exhibits a lightness ($L^*$), according to the 1976 CIE ($L^*$, $a^*$, $b^*$) space, of more than 50, in ink formulations, provides ink formulations with inferior marking properties.

In marking of substrates, the color of the substrate, on which the ink formulation is coated, is typically light in order for the marking, typically appearing as marking with dark color, to be contrasting and clearly visible. For dark substrate, a light pigment may be included in the ink formulation. The substrate may be transparent. Examples of transparent substrates include plastic films and substrates of glass. Further, the substrate may have low transparency or even be essentially non-transparent. Typical examples of substrates having low transparency or even being essentially non-transparent are substrates of paper or substrates comprising paper, such as packaging laminates. As the marking typically will have a dark color, the lightness ($L^*$) of the substrate should preferably be high in order for the marking to be contrasting to the background and thereby clearly visible. A blackish, a dark brownish, or a dark grayish marking will be clearly visible on a contrasting white or light gray substrate, such as an uncolored or clay coated paper substrate.

Accordingly, an embodiment relates to an ink formulation comprising a marking component and reduced indium tin oxide (r-ITO), which r-ITO in powder form exhibits a lightness ($L^*$), according to the 1976 CIE ($L^*$, $a^*$, $b^*$) space, of not more than 50. Preferably, the r-ITO in powder form exhibits a lightness ($L^*$), according to the 1976 CIE ($L^*$, $a^*$, $b^*$) space, of at least 20.

The 1976 CIE ($L^*$, $a^*$, $b^*$) space, is a color model adopted in 1976 by CIE (Commision Internationale de lÉclairage; or in English The International Commission on Illumination). It is an opponent color system based on an earlier system of Richard Hunter, which was called L, a, b. Color opposition correlates with discoveries in the mid-1960s, indicating that somewhere between the optical nerve and the brain, retinal color stimuli are translated into distinctions between light and dark, red and green, and blue and yellow. In the 1976 CIE ($L^*$, $a^*$, $b^*$) space color model, this is indicated by the values on three axes: $L^*$, $a^*$, and $b^*$. The central vertical axis represents lightness (signified as $L^*$) and its runs from 0 (black) to 100 (white). The color axes are based on the fact that a color can not be both red and green, or both blue and yellow, because these colors oppose each other. On each axis the values run from positive to negative, and on the a-axis, positive values indicate amounts of red while negative values indicate amounts of green. On the b-axis, positive values indicate amounts of yellow, while negative values indicate amounts of blue. For both axes, zero is neutral gray. As the 1976 CIE ($L^*$, $a^*$, $b^*$) space is device independent, it has become very important and is used for color management. As an example, the 1976 CIE ($L^*$, $a^*$, $b^*$) space is used as a device independent model of the ICC (International Color Consortium).

r-ITO is typically blue and does thus typically display negative a-values. When used in marking applications it should preferably have a lightness ($L^*$) of not more than 50, as indicated above. Preferably, r-ITO for use in marking applications as disclosed herein should thus be dark, such as dark blue.

The lightness ($L^*$) of a sample of r-ITO may be determined by colometry. As an example a SpectroEye spectrophotometer/densitometer from GretagMacbeth may be used. For determining the lightness ($L^*$) of a sample of r-ITO, a powder cell may be used. Further, the following settings may be used: Illumination type: D65, D50 and TL84; Standard Observer: 2° or 10°. Preferably are the illumination type D65 and the standard observer 2°.

However, as indicated above, the 1976 CIE ($L^*$, $a^*$, $b^*$) space is a device independent color model, thus also other spectrophotometers may be used to determine the color of a sample of r-ITO.

Reduced indium tin oxide is a non-stoichiometric compound, comprising indium oxide doped with tin oxide, which doped indium oxide has been reduced. Reduction of indium tin oxide removes oxygen, thus leaving an excess of indium and/or tin in the zero oxidation state, i.e. metallic indium and/or tin. Without being bond to any theory, it is believed to create a free electron that is free to migrate through the solid lattice. This free electron bestows electrical conductivity properties and, in the case of r-ITO NIR absorption properties.

According to an embodiment, more than 0 molar %, such as at least 25 molar % or at least 50 molar %, of the tin in the reduced indium tin oxide (r-ITO), is in the zero oxidation state. Further, less than 100 molar %, such as not more than 75 molar %, of the tin in the reduced indium tin oxide (r-ITO), may be tin in the zero oxidation state. In addition, more than 0 molar %, such as at least 5 molar %, but not more than 25 molar %, or at least 5 molar %, but not more than 15 molar %, of the indium in said reduced indium tin oxide (r-ITO), may be indium in the zero oxidation state.

While the lightness of r-ITO in powder form may be related to the degree of reduction, also other parameters, e.g. stoichiometry, particle size, contaminations, etc., may affect the lightness of r-ITO. As elaborated above, the present inventors have found that the lightness of r-ITO in powder form is a parameter being indicative for the printability of ink formulations comprising NIR-absorbers.

The reduced indium tin oxide is typically present in the form of particles, i.e. as a powder. Particles of reduced indium tin oxide may have a median particle size in the range from 10 nm to 10 µm. Further, the particles may be nanoparticles and the median particle size may accordingly be less than 1 µm, such as less than 250 nm. Nanoparticles may have a median particle size of at least 10 nm. Decreasing the particle size will enhance the NIR-absorbing properties.

According to an embodiment, the median particle size is determined in accordance with ISO Standard 9276-2 or 9276-5. Further, the particles may have a volume based particle size of 10 nm to 10 µm, such as less than 1 µm or even less than 250 nm. The volume based particle size may be at least 10 nm.

Also the In/Sn-ratio in reduced indium tin oxide may be importance for the printability of ink formulations comprising reduced indium tin oxide. An embodiment thus relates to an ink formulation, wherein the reduced indium tin oxide (r-ITO) has a In:Sn weight ratio of less than 12:1. Preferably, the In:Sn weight ratio may be from 6:1 to 12:1, such as from 7:1 to 11:1, or even 8:1 to 10:1.

The marking component of the ink formulation is typically activatable and undergoes a color change upon activation. By this is meant that the marking component gets colored and/or changes color upon activation. Activation is typically achieved by heating. The heating may either directly activate the marking component, or it may activate an activator, such as a thermal acid generator, which in turn activates the marking component. As the ink formulation comprises r-ITO, absorbing irradiation at wavelengths below 2500 nm, NIR-lasers may be used to activate marking components normally undergoing a color change in response to irradiation at wavelengths above 2500 nm, such as heat.

According to an embodiment, the marking component in the ink formulation is a compound, which normally undergoes a color change in response to irradiation at wavelengths above 2500 nm, such as at wavelengths of about 10.6 µm. Further, the marking component may typically be a compound, which in the absence of r-ITO, does not undergo, or to a negligible extent undergoes, a color change in response to irradiation at wavelengths below 2500 nm, such as wavelengths between 780 and 2500 nm. There are various examples of such marking components within the art. It is also to be noted, that the ink formulation may comprise more than one type of marking component.

According to an embodiment, the marking component in the ink formulation comprises an oxymetal anion. WO 02/01250 describes the use of oxymetal salts, such as ammonium octamolybdate (AOM), in laser marking. As an example, the oxymetal anion may be a molybdate, preferably an octamolybdate. A preferred example of a marking component comprising an oxymetal anion is ammonium octamolybdate.

According to an embodiment, the marking component in the ink formulation is a leuco dye. A leuco dye may be a compound undergoing a color change, typically from colorless to colored, upon exposure acidic conditions. By including a thermal acid generator (TAG) in the ink formulation, leuco dyes undergoing a color change upon exposure acidic conditions, i.e. halochromic leuco dye, may be used as marking component in ink formulations comprising r-ITO.

Various TAG:s are known within art. Examples of TAG:s include aromatic hydroxyl compounds, such as bis-Phenol-A, and paraben type compounds, such as benzyl 4-hydroxybenzoate; other examples include urea derivatives such as N-p-tolylsulfonyl-N'-3-(p-tolylsulfonyloxy)phenylurea, known commercially as Pergafast 201 (ex BASF).

Other examples of TAG:s include: amine salts of organic metal compound comprising boron or silicone, such as those disclosed in WO 2006/108745; further examples of TAG:s include those taught in WO 2007/063339, WO 2010/049281, WO 2009/010393, WO 2008/110487, WO 2006/067073, WO 2010/029331, and tosylate TAGs such as those taught in WO 2007/088104.

According to an embodiment, the thermo activated acid generator (TAG) is an amine salt of an organic metal compound comprising boron or silicone according to formula (I). Such salts have been disclosed in WO 2006/108745. Preferred examples of amine salts of organic metal compounds comprising boron or silicone are salts according to formula (I)

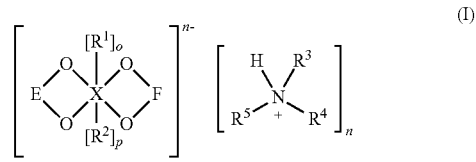

wherein

X is silicon or boron;

"n" is an integer of 1 to 5, preferably 1 or 2;

"o" is an integer being 0 (zero) or 1;

"p" is an integer being 0 (zero) or 1;

E and F individually are selected from the group consisting of

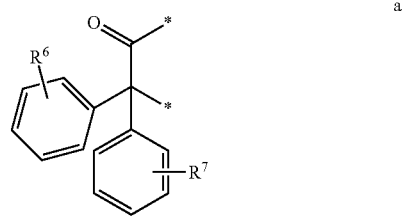

a

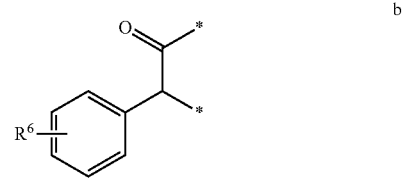

b

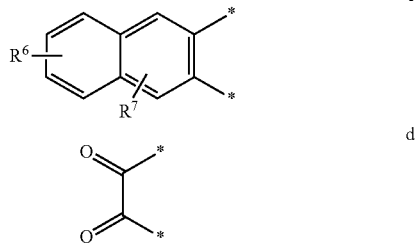

c

d

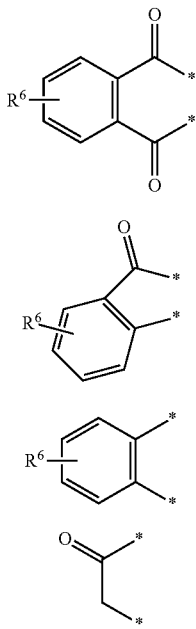

wherein each $R^6$ and $R^7$ are individually selected from the group consisting of hydrogen, $C_{1-4}$-alkyl, $C_{1-4}$-alkoxy, halogen, amino and carboxy; preferably $R^6$ and $R^7$ are hydrogen;

whenever X=silicon, then o=1, p=0, and R1 is aryl, aralkyl or $C_{1-4}$-alkyl, or o=1, p=1, and $R^1$ and $R^2$ together form a residue selected from the group consisting of a, b, c, d, e, f, g and h;

whenever X=boron, then o=0 and p=0; and $R^3$, $R^4$ and $R^5$ are individually selected from the group consisting of hydrogen, $C_{1-12}$-alkyl, $C_{1-6}$-hydroxyalkyl, allyl, aralkyl and arylsulfonyl, in which aralkyl or arylsulfonyl may be substituted with $C_{1-4}$-alkyl; or R3 and R4 together with the nitrogen to which they are attached form a morpholino or piperidino ring, and $R^5$ is selected from the group consisting of hydrogen, $C_{1-12}$-alkyl, $C_{1-6}$-hydroxyalkyl, allyl, aralkyl and arylsulfonyl, in which aralkyl or arylsulfonyl can be substituted with $C_{1-4}$-alkyl.

According to an embodiment, alkyl, as used herein, is intended to mean a straight or branched saturated hydrocarbon radical. Further, according to an embodiment, alkoxy is intended to mean an —O-alkyl group. Aralkyl is, according to an embodiment, intended to mean alkandiylaryl. Additionally, arylsulfonyl is, according to an embodiment, intended to mean an —SO₂aryl group. Aryl, as used herein, is, according to an embodiment, intended to mean a carbocyclic (all carbon) ring or two or more fused carbocyclic rings (rings that share two adjacent carbon atoms) that have a fully delocalized pi-electron system. According to an embodiment, carboxy, as used herein, is intended to mean a —COOH or a —COO⁻ group. According to an embodiment, amino, as used herein, is intended to mean an —NH₂. In some embodiments, amino may further include —NHC$_{1-4}$alkyl, as well as —N(C$_{1-4}$alkyl)$_2$.

As used herein, the integers "x1" and "x2" in "$C_{x1-x2}$" refer to the number of carbon atoms in the relevant group. That is, the group contains from "x1" to "x2" carbon atoms. For example a "$C_{1-4}$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

Examples for $C_{1-4}$-alkyl are methyl, ethyl, propyl, isopropyl, butyl, sec-butyl, isobutyl and tert-butyl; examples for $C_{1-4}$-alkoxy are methoxy, ethoxy, propoxy, isopropoxy, butoxy, sec-butyoxy, isobutoxy and tert-butoxy; examples of halogen are chlorine, bromine, fluorine, and iodine; examples of aryl are phenyl, 1-naphthyl, 2-naphthyl and pyridyl; examples of aralkyl are benzyl and 2-phenylethyl; examples of $C_{1-12}$-alkyl are methyl, ethyl, propyl, isopropyl, butyl, sec-butyl, isobutyl and fert-butyl, pentyl, hexyl, heptyl, octyl, 2-ethylhexyl, nonyl, decyl, undecyl and dodecyl; examples of $C_{1-6}$-hydroxyalkyl are hydroxy methyl, 2-hydroxyethyl, 2-hydroxypropyl, 3-hydroxypropyl, 4-hydroxybutyl, 5-hydroxypentyl and 6-hydroxyhexyl; and examples of arylsulfonyl are phenylsulfonyl and tosyl.

Preferably, $R^3$, $R^4$ and $R^5$ are individually selected from the group consisting of hydrogen, $C_{1-12}$-alkyl, and allyl; or $R^3$ and $R^4$ together with the nitrogen to which they are attached form a morpholino or piperidino ring, and $R^5$ is selected from the group consisting of hydrogen, $C_{1-12}$-alkyl, and allyl. Preferred examples of amine salts of organic metal compound comprising boron are salts according to formula (I), wherein E and F individually are selected from the group consisting of a, b, f, g, and h, such as from a, b and g. Preferred examples of amine salts of organic metal compound comprising silicon are salts according to formula (I), wherein E and F individually are selected from the group consisting of a, b, c, d, and e, such as from a, b, and c. Whenever X=silicon, o=1, and p=0, then it is preferred for $R^1$ to be phenyl.

As an example of groups of E and F, a may be a residue of benzilic acid, b may be a residue of mandelic acid, and c may be residue of naphthalene-2,3-diol. Further, R6 and R7 may be hydrogen.

Typical examples of compounds according to formula (I) are the following:

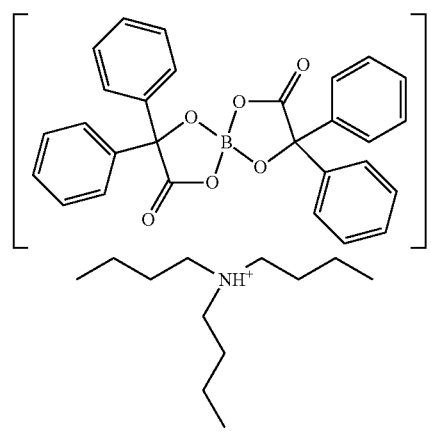

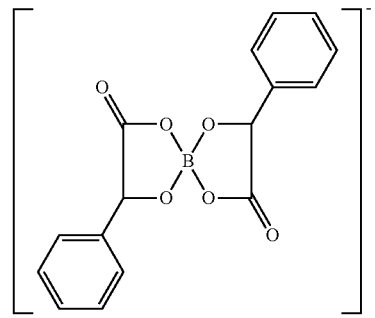

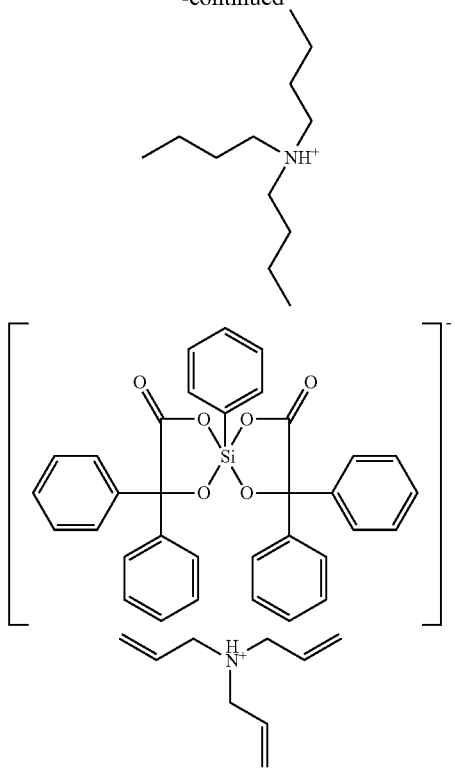

Examples of leuco dyes undergoing a color change upon exposure to acidic conditions are phthalides, fluorans, triaryllmethanes, benzoxazines, quinazo lines, spiropyrans, quinones, thiazines, oxazines and mixtures thereof.

Among various existing examples of phthalides may be mentioned crystal violet lactone (3,3-bis(p-dimethylaminophenyl)-6-dimethyl-aminophtalide), 3,3-bis(p-dimethylaminophenyl)phthalide, 3,3-bis(1-ethyl-2-methylindol-3-yl)phthalide, 3,3-bis(1-octyl-2-methylindol-3-yl)phthalide (sold for example under the tradename Ciba® Pergascript® Red I 6 B), 3-(4-diethylaminophenyl)-3-(1-ethyl-2-methylindol-3-yl)-phthalide, 7-(N-ethyl-N-isopentylamino)-3-methyl-1-phenylspiro[4H-chromeno-[2,3-c]pyrazole-4(1H)-3'phthalide, 3,6,6'-tris(dimethylamino)spiro[fluorene-9,3'-phthalide], 3,6,6'-tris(diethylamino)spiro[fluorene-9,3'-phthalide], 3,3-bis-[2-(p-dimethylaminophenyl)-2-(p-methoxyphenyl)ethenyl-4,5,6,7-tetrabromophthalide, 3,3-bis[2-(p-dimethylamino-phenyl)-2-(p-methoxyphenyl)ethenyl-4,5,6,7-tetrachlorophthalide, 3,3-bis[1,1-bis(4-pyrro-lidinophenyl)ethylene-2-yl]-4,5,6,7-tetrabromophthalide, 3,3-bis-[1-(4-methoxyphenyl)-1-(4-pyrridinophenyl)ethylene-2-yl]-4,5,6,7-tetrachlorophthalide, 3-(4-diethylamino-2-ethoxy-phenyl)-3-(1-ethyl-2-methylindol-3-yl)-4-azaphthalide, 3-(4-diethylamine-2-ethoxyphenyl)-3-(1-octyl-2-methylindol-3-yl)-4-azaphthalide and 3-(4-cyclohexylethylamino-2-methoxy-phenyl)-3-(1-ethyl-2-methylindol-3-yl)-4-azaphthalide. Phthalides may be prepared by methods known in the art, for example crystal violet lactone can be prepared as described in GB 1,347,467, and 3,3-bis(1-ethyl-2-methylindol-3-yl)phthalide can be prepared as described in GB 1,389,716.

Among various existing examples of fluorans may be mentioned 3-di(ethyl)amino-6-methyl-7-(tert-butoxycarbonyl)anilinofluoran, 3-diethylamino-7-dibenzylaminofluoran, 3-dibutylamino-7-dibenzylaminofluoran, 3-diethyl-amino-6-methyl-7-(dibenzylamino)fluoran, 3-diethylamino-6-methylfluoran, 3-diethylamino-6-chloro-7-methylfluoran, 3-diethylamino-6-methyl-7-chlorofluoran, 3-diethylamino-7-fert-butylfluoran, 3-diethylamino-7-(ethoxycarbonyl)-fluoran (as sold for example under the tradename Ciba® Pergascript® Orange IG), 3-diethylamino-7-methylfluoran, 3-diethylamino-6,8-dimethylfluoran, 3-diethylamino-7-chlorofluoran, 3-dibutylamino-6-methylfluoran, S-cyclohexylamino-[theta]-chlorofluoran, 3-diethylamino-benzo[a]fluoran, 3-diethylamino-benzo[c]fluoran, 3-dimethylamino-6-methyl-7-anilinofluoran, 3-diethylamino-6-methyl-7-anilinofluoran, 3-diethylamino-6-methyl-7-(2,4-dimethylanilino)fluoran, 3-diethylamino-6-methyl-7-(3-trifluoromethylanilino)fluoran, 3-diethylamino-6-methyl-7-(2-chloroanilino)-fluoran, 3-diethylamino-6-methyl-7-(p-chloroanilino)fluoran, 3-diethylamino-6-methyl-7-(2-fluoroanilino)fluoran, 3-diethylamino-6-methyl-7-(p-octylanilino)fluoran, 3-diethylamino-7-(p-octylanilino)fluoran, 3-diethylamino-6-methyl-7-(p-methylanilino)fluoran, 3-diethylamino-6-ethoxyethyl-7-anilinofluoran, 3-diethylamino-6-methyl-7-(3-methylanilino)fluoran, 3-diethyl-amino-7-(3-trifluoromethylanilino)fluoran, 3-diethylamino-7-(2-chloroanilino)fluoran, 3-diethyl-amino-7-(2-fluoroanilino)fluoran, 3-diethylamino-6-chloro-7-anilinofluoran, 3-dibutylamino-6-methyl-7-anilinofluoran (as sold for example under the tradename Ciba® Pergascript® Black I-2R), 3-dibutylamino-6-methyl-7-(2,4-dimethylanilino)fluoran, 3-dibutylamino-6-methyl-7-(2-chloroanilino)fluoran, 3-dibutylamino-6-methyl-7-(4-chloroanilino)fluoran, 3-dibutylamino-6-methyl-7-(2-fluoroanilino)fluoran, 3-dibutylamino-6-methyl-7-(3-trifluoromethyl-anilino)fluoran, 3-dibutylamino-6-ethoxyethyl-7-anilinofluoran, 3-dibutylamino-6-chloro-anilinofluoran, 3-dibutylamino-6-methyl-7-(4-methylanilino)fluoran, 3-dibutylamino-7-(2-chloroanilino)fluoran, 3-dibutylamino-7-(2-fluoroanilino)fluoran, 3-dipentylamino-6-methyl-7-anilinofluoran, 3-dipentylamino-6-methyl-7-(4-2-chloroanilino)fluoran, 3-dipentyl-amino-7-(3-trifluoromethylanilino)fluoran, 3-dipentylamino-6-chloro-7-anilinofluoran, 3-dipentylamino-7-(4-chloroanilino)fluoran, 3-pyrrolidino-6-methyl-7-anilinofluoran, 3-piperidino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-N-hexylamino)-7-anilinofluoran, 3-(N-ethyl-p-toluidino)-amino-6-methyl-7-anilinofluoran, 3-(N-ethyl-p-toluidino)amino-7-methylfluoran, 3-(N-ethyl-N-isoamylamino)-6-methyl-7-anilinofluoran, 3-(N-ethyl-N-isoamylamino)-7-(2-chloroanilino)-fluoran, 3-(N-ethyl-N-isoannylamino)-6-chloro-7-fluoran,anilinofluoran, 3-(N-ethyl-N-tetrahydrofurfuryl-amino)-6-methyl-7-anilinofluoran, 3-(N-ethyl-N-isobutylamino)-6-methyl-7-anilinofluoran, 3-(N-butyl-N-isoamylamino)-6-methyl-7-anilinofluoran, 3-(N-isopropyl-N-3-pentylamino)-6-methyl-7-anilinofluoran, 3-(N-ethyl-N-ethoxypropylamino)-6-2-methoxy-6-p-(p-dimethyl-aminophenyl)aminoanilinofluoran, 2-chloro-3-methyl-6-p-(p-phenylaminophenyl)amino-anilinofluoran, 2-diethylamino-6-p-(p-dimethylaminophenyl)aminoanilinofluoran, 2-phenyl-6-methyl-6-p-(p-phenylaminophenyl)aminoanilinofluoran, 2-benzyl-6-p-(p-phenylamino-phenyl)aminoanilinofluoran, 3-methyl-6-p-(p-dimethylaminophenyl)aminoanilinofluoran, 3-diethylamino-6-p-(p-diethylaminophenyl)aminoanilinofluoran, 3-diethylamino-6-p-(p-dibutyl-aminophenyl)aminoanilinofluoran and 2,4- dimethyl-6-[(4-dimethylamino)anilino]fluoran. Fluorans may be prepared by methods known in the art, for example 3-diethylamino-7-di-benzylaminofluoran, 3-diethylamino-7-tert-butylfluoran, 3-diethylamino-6-methyl-7-anilinofluoran and 3-diethylamino-6-methyl-7-(2,4-dimethylanilino)fluoran and can be prepared as described in U.S. Pat. No. 5,166,350 A, 3-diethylamino-6-methyl-7-(3-methylanilino)fluoran can be prepared as described in EP 0 546 577 A1, 3-diethylamino-6-chloro-7-anilinofluoran can be prepared as described in DE 2130845, 3-pyrrolidino-6-methyl-7-anilinofluoran and 3-piperidino-6-methyl-7-anilinofluoran can be prepared as described in U.S. Pat. No. 3,959,571 A, 3-(N-ethyl-N-isoamylamino)-6-methyl-7-anilinofluoran can be prepared as described in GB 2 002 801 A, and 3-(N-methyl-N-propylamino)-6-methyl-7-anilinofluoran can be prepared as described in GB 2,154,597 A.

Among various existing examples of benzoxazines may be mentioned 2-phenyl-4-(4-diethylaminophenyl)-4-(4-methoxyphenyl)-6-methyl-7-dimethylamino-3,1-benzoxazine, which can be prepared as described in EP 0 187 329 A1, and 2-phenyl-4-(4-diethylaminophenyl)-4-(4-methoxyphenyl)-8-methyl-7-dimethylamino-3,1-benzoxazine. An example of a quinazoline is 4,4'-[1-methylethylidene)bis(4,1-phenyleneoxy-4,2-quinazolinediyl)]bis[N,N-diethylbenzeneamine]. An example of a triarylmethane is bis(N-methyldi-phenylamine)-4-yl-(N-butylcarbazole)-3-ylmethane, which can be prepared as described in GB 1,548,059.

Among various existing examples of spiropyrans may be mentioned 1',3',3'-trimethylspiro[2H-1-benzopyran-2,2'-indoline], 1,3,3-tri-methylspiro[indoline-2,3'-[3H]naphth[2,1-b][1,4]oxazine] and 1',3',3'-trimethylspiro-[2H-1-benzothiopyran-2,2'-indoline]. An example of a quinone is hematoxyline and an example of an oxazine is 3,7-bis(dimethyl-amino)-10-benzoylphenoxazine. An example of a thiazine is 3,7-bis(dimethylamino)-10-benzoylphenothiazine.

The leuco dye undergoing a color change upon exposure acidic conditions may be a phthalide or a fluoran or mixtures thereof. Additionally, the leuco dye undergoing a color change upon exposure acidic conditions may be, 3,3-bis(1-octyl-2-methylindol-3-yl)phthalide (sold for example under the tradename Ciba® Pergascript® Red I 6 B), 3-di-ethylamino-7-(ethoxycarbonyl)-fluoran (as sold for example under the trade name Ciba® Pergascript® Orange IG) or 3-dibutylamino-6-methyl-7-anilinofluoran (as sold for example under the trade name Ciba® Pergascript® Black I-2R). Another leuco dye is 2'-anilino-6'-[ethyl(p-tolyl) amino]-3'-methylspiro[isobenzofuran-1(3H),9'-[9H]xanthene]-3-one, known commercially as ETAC (ex. Yamada Chemical Co. Ltd).

According to an embodiment, the marking component in the ink formulation is a charrable compound, which also may be denoted char forming compound. Char forming compounds are those that upon heating form a colored char, typically brownish to black. Preferred examples comprises polyhydroxy compounds selected from the group consisting of carbohydrates such as monosaccharides, disaccharides and polysaccharides, and derivatives thereof wherein the carbonyl group has been reduced to a hydroxyl group, so-called sugar alcohols.

Examples monosaccharides are the sugars: glucose, mannose, galactose, arabinose, fructose, ribose, erythrose and xylose; examples of disaccharides are the sugars: maltose, cellobiose, lactose and sucrose; examples of polysaccharides are cellulose, starch, gum arabic, dextrin and cyclodextrin; and examples of sugar alcohols are meso-erythritol, sorbitol, mannitol and pentaerythritol.

More preferred polyhydroxy compounds are disaccharides, polysaccharides and sugar alcohols. Most preferred polyhydroxycompounds are sucrose, gum arabic and meso-erythritol.

When a polyhydroxy compound can exist as the D-enantiomer, the L-enantiomer or the racemate, all these three forms are comprised. Optionally a salt may be added to assist char formation. Examples of salts assisting char formation include sodium borate, ammonium sulphate, ammonium phosphates, sodium carbonate and sodium bicarbonate. Further examples of char forming agents are taught in WO 2010/026407, WO 2010/049282, WO 2008/083912, WO 2007/031454, and WO 2007/012578.

According to an embodiment, the marking component in the ink formulation is a di-acetylene, which is activated, for example by exposure to heat and which activated di-acetylene may undergo a color change upon exposure to UV-light, but which di-acetylene does not undergo a color change upon exposure to UV-light if not activated. Such as di-acetylenes are described in WO 10/112940 and examples of such di-acetylenes comprises 10,12-pentacosadiynoic acid, 10,12-docosadiyndioic acid, and derivative thereof. Further examples of suitable compounds are taught in WO 2009/093028 and WO 2010/001171.

It will be appreciated by one of ordinary skill in the art that it is possible to incorporate additives of various sorts in the ink formulation, and which might be beneficial in certain circumstances. Such additives include, for example, polymer binders, mild reducing agents to promote thermal printer performance, colorants such as dyes or pigments, light stabilizing agents such as UV-absorbers and hindered amine light stabilizers (HALS), antioxidants and other known stabilisers, pH buffers, acid and base scavengers, anti-blocking materials such as talc or selected silicas, and materials adsorbent to or reactive with any thermolysis products of laser imaging, surfactants, adhesion promoters, dispersing aids, inks flow/rheology modifiers, humectants, slow drying solvents, fast drying solvents, biocides and the like.

According to an embodiment, the ink formulation also comprises a binder. The binder may be one or more of a range of water-soluble or amine-stabilized aqueous emulsion polymers suitable for use in water-based coating or ink formulations. As an example acrylic polymers may be used. Further, the ink formulation may comprise pigments such as water-dispersible inorganic or organic additives such as calcium carbonate etc. The ink formulation may further comprise one or more of a range of additives, including surfactants or lubricants, such as zinc stearate etc., as well as crosslinking agents, such as ZnO, which may be added to reduce image smearing. Further, the ink formulation may comprise antifoaming agents, such as mineral oil based antifoaming agent. The ink formulation may also comprise dispersing agents and/or film forming modifier.

Further, the ink formulation may comprise light stabilizing agents, such as UV absorbers and hindered amines, ink flow/rheology modifiers, drying rate modifiers, such as slow solvents, e.g. diethylene glycol, and plasticisers, and/or adhesion promoters, such as titanate compounds.

According to an embodiment the ink formulation is water-based, i.e. the ink formulation comprises water. As an example, the composition may comprise 5 to 95 wt. %, such 40 to 80 wt. % of an aqueous-based solvent, 5 to 50 wt. %, such as 20 to 40 wt. %, of the marking component, and 0.1 to 10 wt. %, such as 0.25 to 5 wt. %, r-ITO. The aqueous-based solvent may comprise at least 10 wt % water, preferably at least 50 wt %, such as at least 75 wt %, or at least 95 wt %, water. According to an embodiment, the water-based ink formulation comprises 10 to 30 wt. % of a binder, such as an acrylic polymer.

According to an embodiment the ink formulation is water-based, i.e. the ink formulation comprises an organic solvent. As an example, the composition may comprise 5 to 95 wt. %, such as 40 to 80 wt. %, of organic solvent, 5 to 50 wt. %, such as 20 to 40 wt. %, of the marking component, and 0.1 to 10 wt. %, such as 0.25 to 5 wt. %, r-ITO. The organic solvent may be a water miscible solvent. Further, the solvent may be a mixture of solvents. Examples of solvent include water-miscible organic solvents, such as $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethylacetamide, methyl pyrolidone and sulfolane, whereby $C_{1-4}$-alkanols and $C_{2-4}$-polyols may be substituted with $C_{1-4}$-alkoxy groups, and ethyl acetate. According to an embodiment, the ink formulation comprises 10 to 30 wt. % of a binder, such as an acrylic polymer.

Water based formulations has the advantage of being less unhealthy than formulations comprising volatile solvents. An aqueous based ink formulation may further comprise water-miscible organic solvents, such as $C_{1-4}$-alkanols, $C_{2-4}$-polyols, $C_{3-6}$-ketones, $C_{4-6}$-ethers, nitromethane, dimethylsulfoxide, dimethylformamide, dimethylacetamide, methyl pyrolidone and sulfolane, whereby $C_{1-4}$-alkanols and $C_{2-4}$-polyols may be substituted with $C_{1-4}$-alkoxy groups.

Examples of $C_{1-4}$-alkanols are methanol, ethanol, propanol, isopropanol or butanol, isobutanol, sec-butanol and tert-butanol. Examples of a $C_{1-4}$-alkoxyderivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile. Preferably, the water-miscible organic solvent is selected from the group consisting of $C_{1-4}$-alkanols, $C_{2-4}$-polyols, $C_{3-6}$-ketones, dimethylformamide and dimethylacetamide, whereby $C_{1-4}$-alkanols and $C_{2-4}$-polyols may be substituted with $C_{1-4}$-alkoxy groups.

The ink formulation disclosed herein may typically be coated on a substrate, such as packaging material. As an example, the ink formulation may be applied by any known printing or coating process suitable for aqueous based inks such as flood coating, flexography, gravure etc. The dry coat weight may be in the range 0.1 to 20 g/m$^2$, such as 0.5 to 10 g/m$^2$, or 1 to 5 g/m$^2$. As the ink formulation may be applied to the substrate by a printing process, the coating of the substrate may, in some embodiments, be denoted printing. In such embodiments, the marking step is typically denoted imaging.

By irradiating a coated substrate with a NIR-laser, a marking may be obtained. Various types of substrates may be coated with the ink formulation. Examples of such substrates include paper, cardboard, (corrugated) paper board, plastic films, such as polyolefin films, such as PE and PP, cellulose based films, textile, wood, metal, glass, leather, ridged plastic parts, foodstuff, and solid pharmaceutical compositions.

The ink formulation may be applied to the whole of the substrate, which makes the substrate suitable for use in mass customization, or it may be applied as a patch on a relatively small portion of the substrate. The patch may then be irradiated to provide for example human readable date and lot code information and machine readable codes such as 1-D barcodes and 2-D data matrix codes and high data capacity barcodes.

Further, the substrate, on which the ink formulation is coated, may also comprise any substances known in the manufacture of substrates suitable for use in printing, marking, or packaging applications. These substances may exist either within the substrate or on the surface of the substrate. Examples include a layer of clay coating on the substrate surface and barrier layers made from e.g. PE or aluminum and the like.

Further, the ink formulation coated on a substrate may be covered by a thermoplastic polymer layer, such that the ink formulation is protected by the thermoplastic polymer layer. In such an embodiment, the ink formulation is situated between the substrate and the thermoplastic polymer layer and/in the thermoplastic polymer layer. A substrate coated with the ink formulation, wherein ink formulation has been covered by a thermoplastic polymer layer, may be denoted over laminated. Over lamination may protect the markable coating, and/or impart other properties to the substrate, such as impermeability. The over lamination process may be done as a coating finish or by extruding a molten polymer or laminating a pre-made polymer filmover the surface coated with the composition disclosed herein. The substrate may be over laminated by a polyolefin, such as polyethylene (e.g. low-density polyethylene (LDPE)) or polypropylene.

In an example with a packaging material laminate, the substrate is selected from paper or paper board. Further, it is preferred if the ink formulation is covered by a thermoplastic polymer layer, when used in packaging material laminate.

According to one embodiment, the coated substrate is selected from paper, cardboard, corrugated paper board, paper board, the marking component is ammonium octamolybdate, or a leuco dye, the ink formulation may further comprise a thermal acid generator if the marking component is a leuco dye, and the ink formulation coated on the substrate is covered by a polymer layer, wherein the polymer is a polyolefin.

As well as being applied to a substrate as a coating, the ink formulations disclosed herein may also be incorporated directly into a substrate. They may for example be co-extruded into polymer films or co-molded into plastic articles, or added directly into paper or card, e.g. added to paper pulp at the sizing stage.

As a specific example the substrate may be part of a packing material, such as liquid food packaging material. According to an embodiment, such a packing material comprises an innermost layer (optionally being a multi-layer film) of a polyolefin intended to be in contact with the product, such as liquid food. Between the substrate and the innermost layer, a barrier material is arranged. The thermoplastic polymer layer of the substrate is the outermost layer of the liquid food packaging material and whereby not intended to be in contact with the product. The barrier material may be a gas barrier such as an oxygen barrier; a water vapor barrier; light barrier or odour barrier. An example of a barrier material is an aluminium foil or a film containing a metal vapour deposited layer. Other barrier materials are ethylene vinylalcohol copolymer (EvOH) and polyamide (PA). Optionally an adhesive layer in order to promote the adhesion is used between for example the barrier layer and the innermost layer. The substrate is selected from paper, cardboard, corrugated paper board, paper board, plastic film, such as a multi-layer film, ridged plastic parts, textile, wood, metal, glass, or leather. Optionally a bonding layer is arranged between the substrate and the barrier material. The substrate normally has a print and is covered by an outer thermoplastic polymer layer, e.g. LDPE or blends thereof.

The innermost layer may be a low density polyethylene selected from LDPE, LLDPE, mLLDPE and VLDPE or blends thereof. The innermost layer is possible to heat seal.

Independently of each other the adhesive layer and the bonding layer may be an ethylene acrylic acid copolymer (EAA), ethylene methacrylic acid copolymer or an LDPE.

A further embodiment relates to a liquid food package comprising such a food packaging material described herein above. The liquid food package may be obtained by a roll fed system where the packaging material is fed to the filling machine. FIG. 4 schematically illustrates a roll fed filling machine where the packaging material is sterilized, folded into a tube (61) and longitudinally sealed (63). The longitudinally sealed tube is filled with product (64) before being transversally sealed (65) (form-fill-seal technology). The sealing may be done by induction sealing or ultrasonic sealing. The sealed package is thereafter cut and finally folded into a package (66). Alternatively the packaging material may be pre-cut before used in the filling machine. Pre-cut packaging material is normally referred to as blanks and has been used for example in manufacturing of packages of gable top type.

In connection with filling the liquid food package with a liquid food and sealing the package, information may be printed on the substrate via activation of the ink formulation. The sterilization of the packaging material is conventionally done by hydrogen peroxide and/or by radiation, such as UV or EB radiation. As the ink formulation is covered by thermoplastic polymer layer, it is protected during the steps in the filling machine where the ink otherwise could be compromised, for example by discoloration.

According to an embodiment the ink formulation is coated on a substrate having an outermost surface of paper, optionally being clay coated.

According to another embodiment the ink formulation is coated on a substrate having an outermost plastic surface, such as a substrate forming part of a ridged plastic part, a substrate being a plastic film, or the substrate being a laminate, wherein the outermost layer is a plastic layer.

A further embodiment relates to a method for marking a substrate. Examples of substrate have been disclosed herein. In such a method, the substrate is coated with the ink formulation comprising r-ITO, which r-ITO in powder form exhibits a lightness (L*), according to the 1976 CIE (L*, a*, b*) space, of not more than 50, and a marking component. Preferably, the r-ITO in powder form exhibits a lightness (L*), according to the 1976 CIE (L*, a*, b*) space, of at least 20. Subsequent to coating the surface, those parts of the coated substrate, where a marking is intended, may be irradiated, typically with a laser. Before being irradiated, the ink formulation may optionally be covered by a polymer layer.

According to an embodiment, only parts of the coating are irradiated whereby a marking with a defined pattern may be obtained. Typically, although not necessary, at least part of the substrate is provided with a flat coating in such an embodiment. Upon irradiating such a flat coating, a marking will appear where the coating is irradiated. By only irradiating parts of the flat coating a marking with a defined pattern may be obtained. Figuratively speaking, this may be seen as writing, or etching, with a laser beam in the coating.

According to another embodiment, the ink formulation is coated in a defined pattern. In marking such a coated substrate, the entire coating, or at least part of the defined pattern, is irradiated in order to generate a marking. Figuratively speaking, this may be seen as developing a coated pattern in order to obtain a marking.

Preferably, the laser has an operating wavelength in the range 780 to 2500 nm, as such NIR-radiation will be absorbed by r-ITO resulting in heating of the irradiated parts and subsequently of marking of the substrate. As an example, Nd:YAG lasers or a NIR fiber lasers may be used to irradiate the coated surface. The laser can be a single beam, or a multiple beam array type system. Lasers typically apply light to the substrate using a steered beam system. However, a mask arrangement may also be used.

In addition to lasers, also diodes, fiber coupled diode array systems or diode array systems operating in the wavelength range 700 to 2500 nm may be used to supply light to generate a marking. Diode array systems, which may emit both coherent and non-coherent light, are particularly suitable for use in high speed continuous or 'on the fly' imaging.

Another embodiment relates to a marked substrate. Such a marked substrate is obtainable as just described.

As reduced indium tin oxide(r-ITO), exhibiting a lightness (L*), according to the 1976 CIE (L*, a*, b*) space, of not more than 50 have been found to provide ink formulations, comprising a marking component, with improved marking properties, a further embodiment relates to a use of reduced indium tin oxide(r-ITO), exhibiting a lightness (L*), according to the 1976 CIE (L*, a*, b*) space, of not more than 50, in laser marking applications.

Preferably, the r-ITO exhibits a lightness (L*), according to the 1976 CIE (L*, a*, b*) space, of at least 20. The color of a sample of r-ITO may be determined by colometry. As an example a SpectroEye spectrophotometer/densitometer from GretagMacbeth may be used. For determining the color of a sample of r-ITO, a powder cell may be used. Further, the following settings may be used: Illumination type: D65, D50 and TL84; Standard Observer: 2° or 10°. Preferably are the illumination type D65 and the standard observer 2°.

Further, reduced indium tin oxide(r-ITO) comprises indium and/or tin in the zero oxidation state, i.e. metallic indium and/or tin. Thus, more than 0 molar %, such as at least 25 molar % or at least 50 molar %, of the tin in the reduced indium tin oxide (r-ITO), may be tin in the zero oxidation state. Further, less than 100 molar %, such as not more than 75 molar %, of the tin in the reduced indium tin oxide (r-ITO), may be tin in the zero oxidation state. In addition, more than 0 molar %, such as at least 5 molar % but not more than 25 molar %, or at least 5 molar % but not more than 15 molar %, of the indium in said reduced indium tin oxide (r-ITO), may be indium in the zero oxidation state.

The reduced indium tin oxide is typically present in the form of particles. These particles may have a median particle size in the range from 10 nm to 10 μm. Further, the particles may be nanoparticles and the median particle size may accordingly be less than 1 μm, such as less than 250 nm. Decreasing the particle is believed to enhance the NIR-absorbing property.

According to an embodiment, the median particle size is determined in accordance with ISO Standard 9276-2 or 9276-5. Further, the particles may have a volume based particle size of 10 nm to 10 μm, such as less than 1 μm or even less than 250 nm.

Further, the reduced indium tin oxide (r-ITO) may have a In:Sn weight ratio of less than 12:1. Preferably, the In:Sn weight ratio may be from 6:1 to 12:1, such as from 7:1 to 11:1, or even 8:1 to 10:1. As an example, the In:Sn weight ratio may be about 8.7:1.

Without further elaboration, it is believed that one skilled in the art can, using the preceding description, utilize the present invention to its fullest extent. The preferred specific embodiments described herein are, therefore, to be construed as merely illustrative and not limitative of the remainder of the description in any way whatsoever. Further, although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc do not preclude a plurality.

EXPERIMENTAL

The following examples are mere examples and should by no mean be interpreted to limit the scope of the invention. Rather, the invention is limited only by the accompanying claims.

Example 1

Four samples of r-ITO nanopowder, each from different a supplier, were obtained:
1. Having a molar In:Sn ratio of 89:11
2. Having a molar In:Sn ratio of 92.7:7.5
3. Having a molar In:Sn ratio of 89:11
4. Having a molar In:Sn ratio of 89:11 r-ITO samples no. 1, 3, and 4, were all dark blue powders, while sample no. 2 was a light blue powder.

Other Materials:

Elvacite 2028 (ex. Lucite International, a low molecular weight methacrylate copolymeric binder).

Ammonium octamolybdate (AOM) powder (ex. DataLase Ltd, marking component).

Aerosil 200 (ex. Evonik, fumed silica, anti settling agent).

Ethyl acetate (solvent).

Denatured Ethanol B100 (DEB100, solvent).

An ink formulation comprising r-ITO was made by mixing the following component to obtain four formulations (no. 1 to 4, wherein no. 1 comprises r-ITO denoted 1 above, etc.) in total.

| | |
|---|---|
| r-ITO sample | 2.5 wt. % |
| AOM | 25 wt. % |
| Elvacite 2028 | 20 wt. % |
| Aerosil 200 | 0.5 wt. % |
| Ethyl acetate | 15 wt. % |
| DEB100 | 37 wt. % |

Each ink formulation was premixed using a Silveron mixer. The premixed ink was then milled using an Eiger-Torrance 50 ml capacity bead mill for 10 minutes to achieve a dispersion with a particle size of less than 5 micron measured using a Hegmann gauge. Subsequently, the viscosity of the each ink formulation was adjusted to 30 seconds, Zahn 2 cup, using 3:1 DEB100:ethyl acetate.

Each ink was then drawn down on to white, 50 micron, PET film using a K2 bar fitted to an RK K-Control model 202 coating machine. A coat weight of approximately 5 g/m² was obtained in each case.

Figure 1:
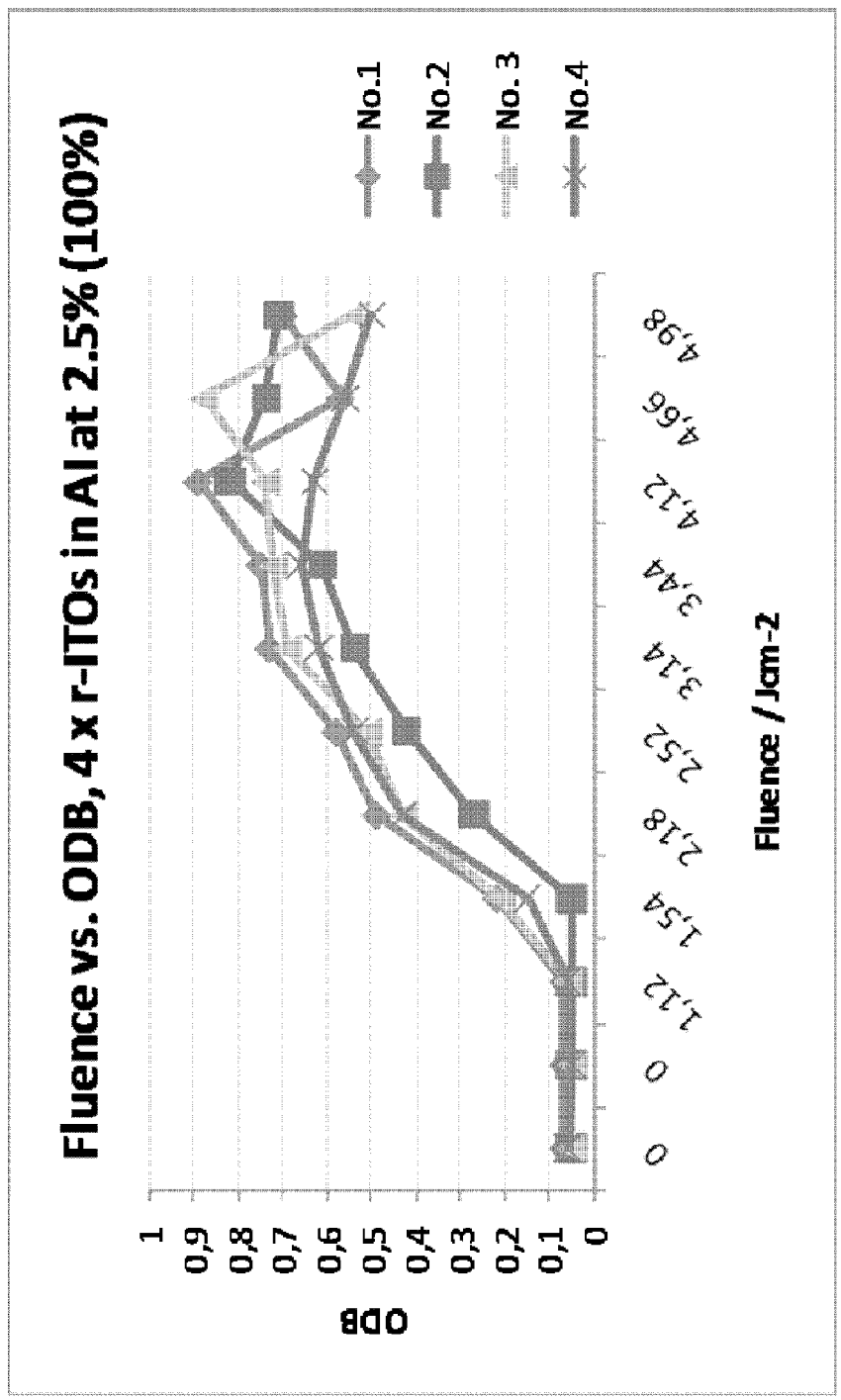
FIGS. 1, 2 and 3, respectively, depicts the marking properties of ink formulations comprising r-ITO and a marking component (AOM).
Figure 2:
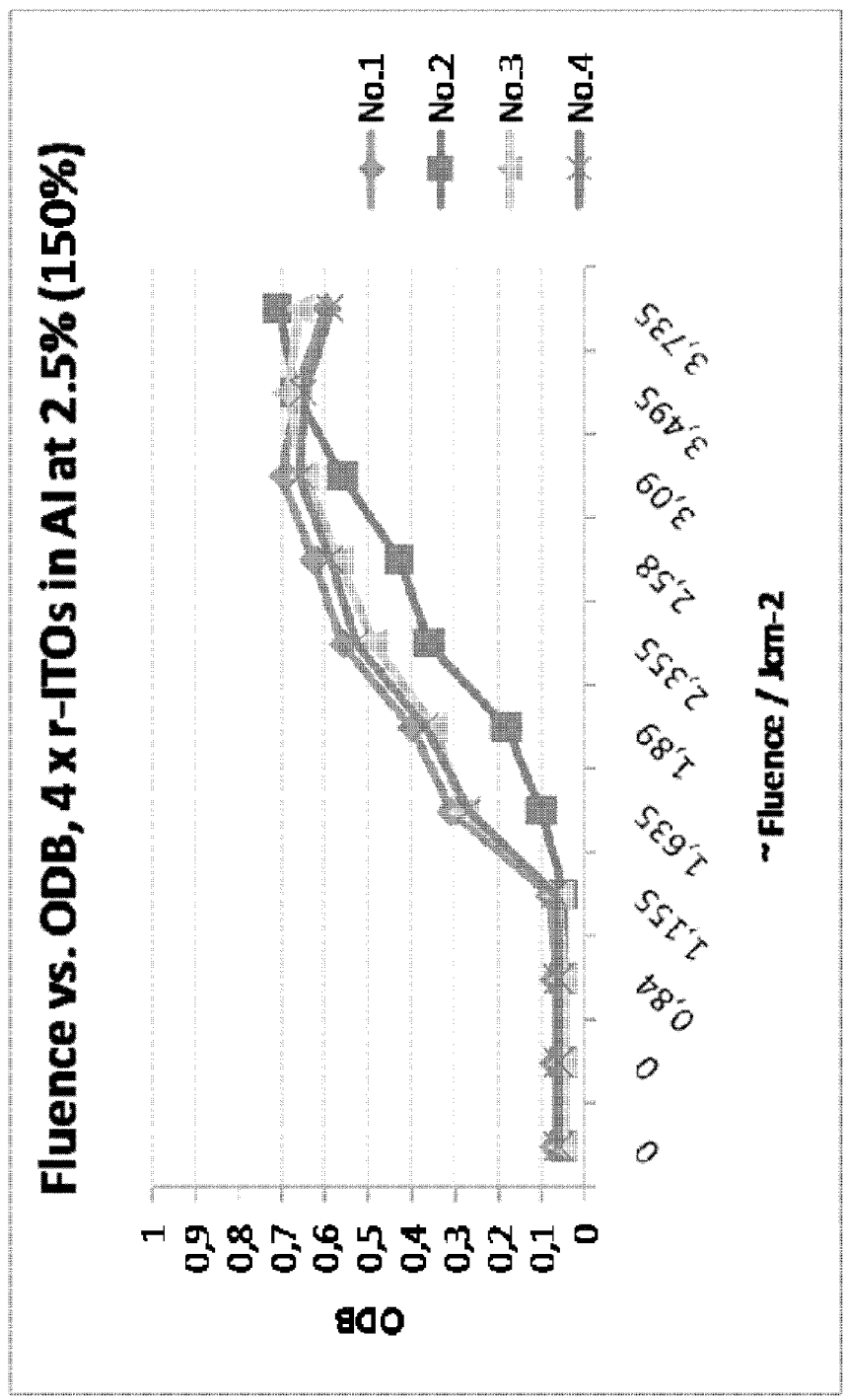

Each drawdown was then imaged using a 5W, 1550 nm fibre laser fitted with a galvo mirror based imaging head, linked to a PC. Imaging was performance over two fluence ranges: 0 to 5 J/cm² (100% speed) and 0 to 3.7 J/cm² (150% speed). The results are presented in FIGS. 1 and 2.

Further, the absorbance of both the r-ITO powder and the drawdown was obtained at 550 nm and 1550 nm. This was performed using a Varian-Cary Spectrophotometer linked to a PC. The results are presented below in Table 1.

TABLE 1

| | 550 nm | | 1550 nm | |
|---|---|---|---|---|
| Formulation | Powder | DD* ~5 g/m² | Powder | DD* ~5 g/m² |
| 1 | 1.261503 | 0 | 1.80953 | 0.6984 |
| 2 | 0.733131 | 0 | 2.30873 | 0.382 |
| 3 | 1.089755 | 0 | 1.79216 | 0.6612 |
| 4 | 1.18905 | 0 | 1.96642 | 0.6872 |

*DD = drawdown (coated PET film)

As seen from the powder scans in table 1, it would appear as the sample from supplier 2 would be the most efficient NIR-absorber, having the lowest absorbance in the visible area and the highest absorbance in the near infra red area. However, as also seen from table 1, another trend emerges from the results obtained with coated ink formulations. For coated formulations the absorbance for the formulation comprising r-ITO from supplier 2, having a lower Sn-content and being lighter (i.e. less dark), were surprisingly found to have inferior absorbance at 1550 nm compared to the other formulations. Further, as seen from FIGS. 1 and 2, this trend is confirmed as formulation 2, comprising r-ITO from supplier 2, displayed lower ODB (optical density black) at the same laser fluence, compared to the other samples.

Example 2

In total 14 samples of r-ITO nanopowder with primary particle size less than 250 nm, obtained from various suppliers, were evaluated. The lightness of each sample according to the 1976 CIE (L*, a*, b*) space were determined using a Gretag-Macbeth Spectroeye (Illumination type: D65; and Standard Observer: 2°) in combination with a powder cell.

The lightness, as determined, and the In:Sn weight ratio as indicated by the supplier, for each sample is provided below in Table 2.

Further, the ODB resulting from imaging at 1550 nm (fluence of 3.5 J/cm²) is indicated. For the ODB measurements, an ink formulation comprising r-ITO was made by mixing the following component to obtain ink formulations.

r-ITO sample 2.5 wt. %

Ammonium octamolybdate (marking component) 30 wt. %

Elvacite 2028 (acrylic resin binder) 15 wt. %

Denatured Ethanol B 100:Ethyl acetate (3:1) 52.5 wt. %

Each ink formulation was milled using an Eiger-Torrance 50 ml capacity bead mill for 10 minutes to achieve a dispersion with a particle size of less than 5 micron measured using a Hegmann gauge. Subsequently, the viscosity of the each ink formulation was adjusted to 30 seconds, Zahn 2 cup, using 3:1 DEB100:ethyl acetate.

Each ink was then drawn down on to white, 50 micron, PET film using a K2 bar fitted to an RK K-Control model 202 coating machine. A dry coat weight of approximately 7.5 g/m² was obtained in each case. Each drawdown was then imaged using a 5 W, 1550 nm fibre laser fitted with a galvo mirror based imaging head, linked to a PC. Imaging was performance over two fluence ranges: 0 to 5 J/cm² (100% speed) and 0 to 3.7 J/cm² (150% speed).

TABLE 2

| Sample No. | Lightness (L*) | [In] | [Sn] | ODB* at 3.5 J/cm2 |
|---|---|---|---|---|
| 2:1 | 23.25 | 90 | 10 | 1.23 |
| 2:2 | 29.42 | 80 | 20 | 1.12 |
| 2:3 | 29.91 | 90 | 10 | 0.87 |
| 2:4 | 35.16 | 93 | 7 | 1.01 |
| 2:5 | 38.27 | 90 | 10 | 0.95 |
| 2:6 | 39.74 | 90 | 10 | 0.93 |
| 2:7 | 41.36 | 80 | 20 | 1.13 |
| 2:8 | 44.95 | 75 | 25 | 1.2 |
| 2:9 | 46.54 | 95 | 5 | 0.96 |
| 2:10 | 50.33 | 93 | 7 | 0.09 |
| 2:11 | 60.73 | 98 | 2 | 0 |
| 2:12 | 61.11 | 93 | 7 | 0 |
| 2:13 | 61.86 | 98 | 2 | 0.22 |
| 2:14 | 66.56 | 85 | 15 | 0.25 |

*Optical density black as measured by a densitometer

Figure 3:
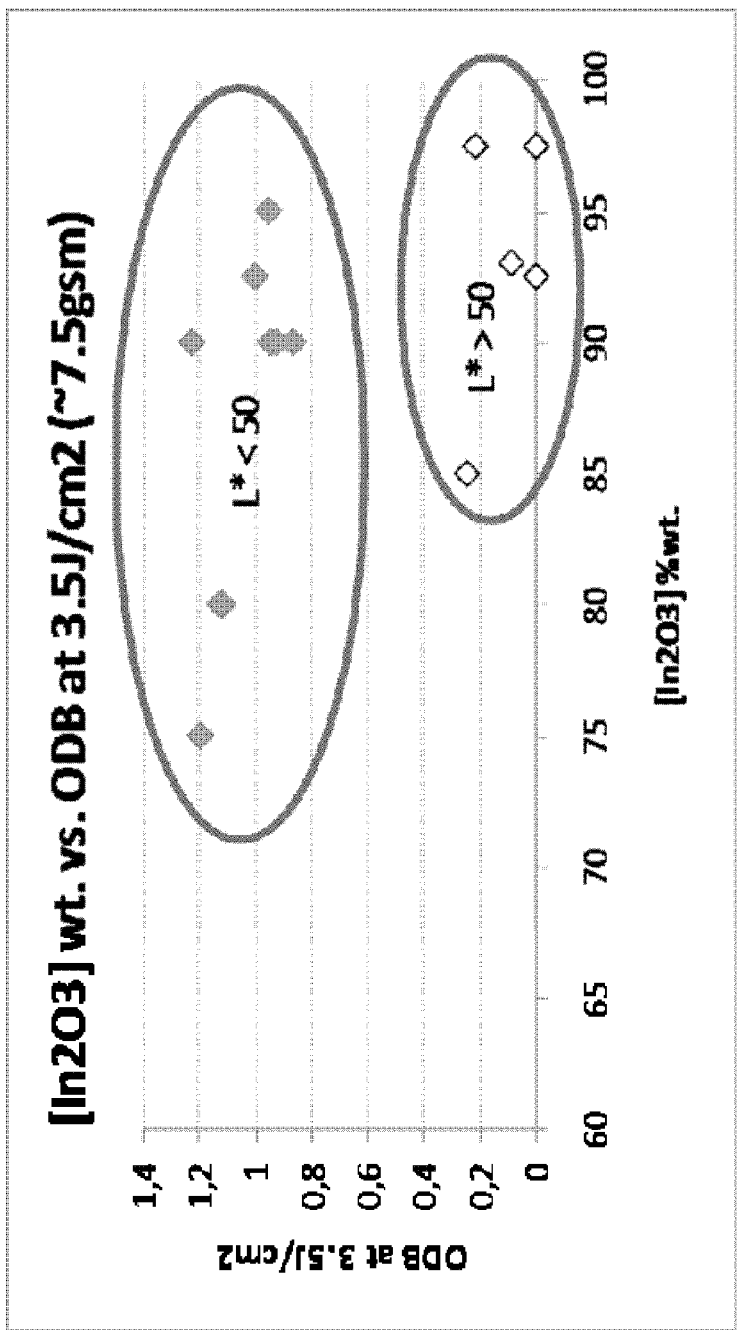
Figure 4:
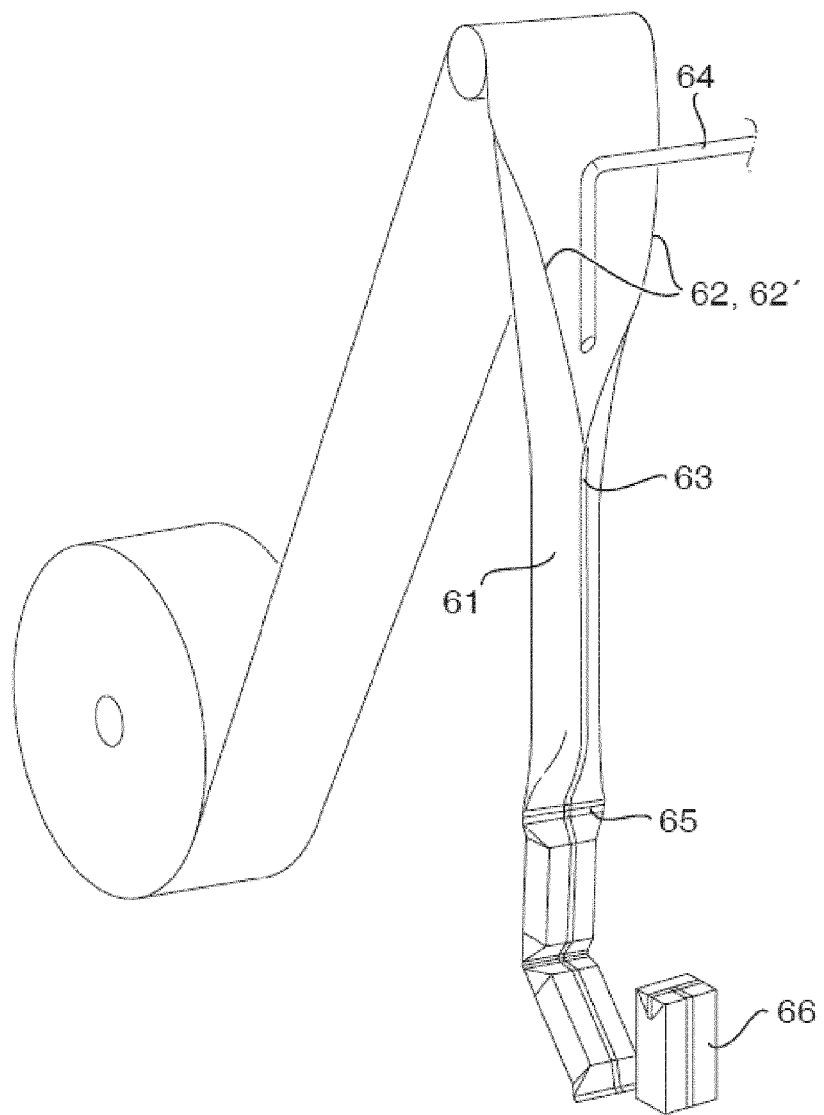
FIG. 4 depicts a fed filling machine.

As seen from Table 2 and FIG. 3, wherein the ODB is plotted vs. the weight percentage of In of the samples in Table 2, a dramatic decrease in markability, i.e. the ODB resulting from irradiation at 3.5 J/cm², is seen for samples of r-ITO having a lightness of more than 50.

The invention claimed is:

1. An ink formulation comprising a marking component and reduced indium tin oxide (r-ITO), which r-ITO in powder form has a median particle size in the range from 10 nm to 10 μm, an In:Sn weight ratio less than 12:1, and exhibits a lightness (L*), according to the 1976 CIE (L*, a*, b*) space, of not more than 50.

2. The ink formulation according to claim 1, wherein said r-ITO in powder form exhibits a lightness (L*), according to the 1976 CIE (L*, a*, b*) space, of at least 20.

3. The ink formulation according to claim 1 or 2, wherein more than 0 (zero) molar % of the tin in said reduced indium tin oxide (r-ITO), is tin in the zero oxidation state, or more than 25 molar % of the tin in said reduced indium tin oxide (r-ITO), is tin in the zero oxidation state, and/or not more than 75 molar %, of the tin in the reduced indium tin oxide (r-ITO), is tin in the zero oxidation state.

4. The ink formulation according to claim 1, wherein said reduced indium tin oxide is present in the form of particles with a median particle size less than 1 μm.

5. The ink formulation according to claim 1, wherein the In:Sn weight ratio in said reduced indium tin oxide (r-ITO) is between 6:1 and 12:1.

6. The ink formulation according to claim 1, wherein the marking component comprises a molybdate and ammonium octamolybdate, or, the marking component is a leuco dye, a char forming agent, or di-acetylene, which may be activated by exposure to heat and which activated di-acetylene may undergo a color change upon exposure to UV-light, but which di-acetylene does not undergo a color change upon exposure to UV-light, if not activated.

7. The ink formulation according to claim 6, wherein the molybdate comprises an octamolybdate.

8. The ink formulation according to claim 6, wherein said leuco dye undergoes a color change upon exposure to acidic conditions, and wherein said ink formulation further comprises a thermal acid generator.

9. The ink formulation according to claim 8, wherein said leuco dye is 2'-anilino-6'-[ethyl(p-tolyl)amino]-3'-methyl-spiro[isobenzofuran-1(3H),9'-[9H]xanthene]-3-one, or the thermal acid generator is an amine salt of an organic metal compound comprising boron or silicone.

10. The ink formulation according to claim 8, wherein said leuco dye is a fluoran or the thermal acid generator is an amine salt of an organic metal compound comprising boron or silicone.

11. The ink formulation according to claim 10, wherein said thermal acid generator is according to formula (I)

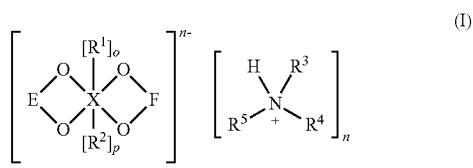

wherein
X is silicon or boron;
"n" is an integer of 1 to 5;
"o" is an integer being 0 (zero) or 1;
"p" is an integer being 0 (zero) or 1;
E and F individually are selected from the group consisting of

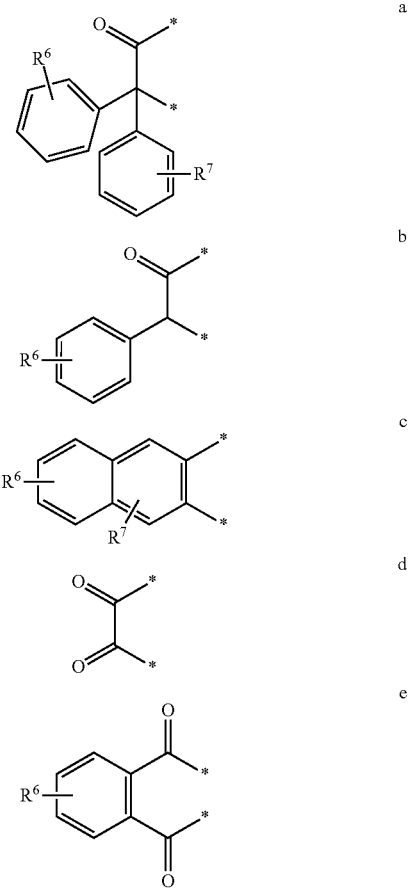

-continued

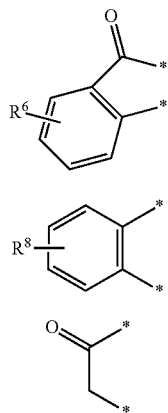

f g h wherein each $R^6$ and $R^7$ are individually selected from the group consisting of hydrogen, $C_{1-4}$-alkyl, $C_{1-4}$-alkoxy, halogen, amino and carboxy;

whenever X=silicon, then o=1, p=0, and $R^1$ is aryl, aralkyl or $C_{1-4}$-alkyl, or o=1, p=1, and $R^1$ and $R^2$ together form a residue selected from the group consisting of a, b, c, d, e, f, g and h;

whenever X=boron, then o=0 and p=0; and $R^3$, $R^4$ and $R^5$ are individually selected from the group consisting of hydrogen, $C_{1-12}$-alkyl, $C_{1-6}$-hydroxyalkyl, allyl, aralkyl and arylsulfonyl, in which aralkyl or arylsulfonyl may be substituted with $C_{1-4}$-alkyl; or $R^3$ and $R^4$ together with the nitrogen to which they are attached form a morpholino or piperidino ring, and $R^5$ is selected from the group consisting of hydrogen, $C_{1-12}$-alkyl, $C_{1-6}$-hydroxyalkyl, allyl, aralkyl and arylsulfonyl, in which aralkyl or arylsulfonyl can be substituted with $C_{1-4}$-alkyl.

12. The ink formulation according to claim 10, wherein said thermal acid generator is according to formula (I)

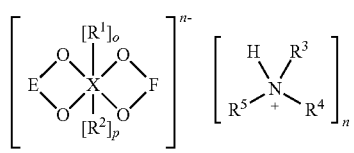

(I)

wherein

X is silicon or boron;

"n" is an integer of 1 or 2;

"o" is an integer being 0 (zero) or 1;

"p" is an integer being 0 (zero) or 1;

E and F individually are selected from the group consisting of

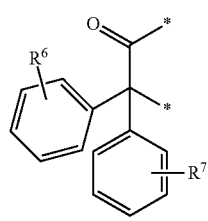

a

-continued

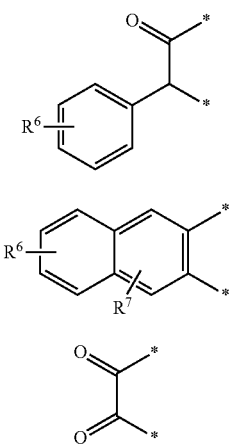

b c d e f g h wherein each $R^6$ and $R^7$ are hydrogen;

whenever X=silicon, then o=1, p=0, and $R^1$ is aryl, aralkyl or $C_{1-4}$-alkyl, or o=1, p=1, and $R^1$ and $R^2$ together form a residue selected from the group consisting of a, b, c, d, e, f, g and h;

whenever X=boron, then o=0 and p=0; and $R^3$, $R^4$ and $R^5$ are individually selected from the group consisting of hydrogen, $C_{1-12}$-alkyl, $C_{1-6}$-hydroxyalkyl, allyl, aralkyl and arylsulfonyl, in which aralkyl or arylsulfonyl may be substituted with $C_{1-4}$-alkyl; or $R^3$ and $R^4$ together with the nitrogen to which they are attached form a morpholino or piperidino ring, and $R^5$ is selected from the group consisting of hydrogen, $C_{1-12}$-alkyl, $C_{1-6}$-hydroxyalkyl, allyl, aralkyl and arylsulfonyl, in which aralkyl or arylsulfonyl can be substituted with $C_{1-4}$-alkyl.

13. The ink formulation according to claim 11, wherein said thermal acid generator is according to formula (I) is selected from the group consisting of:

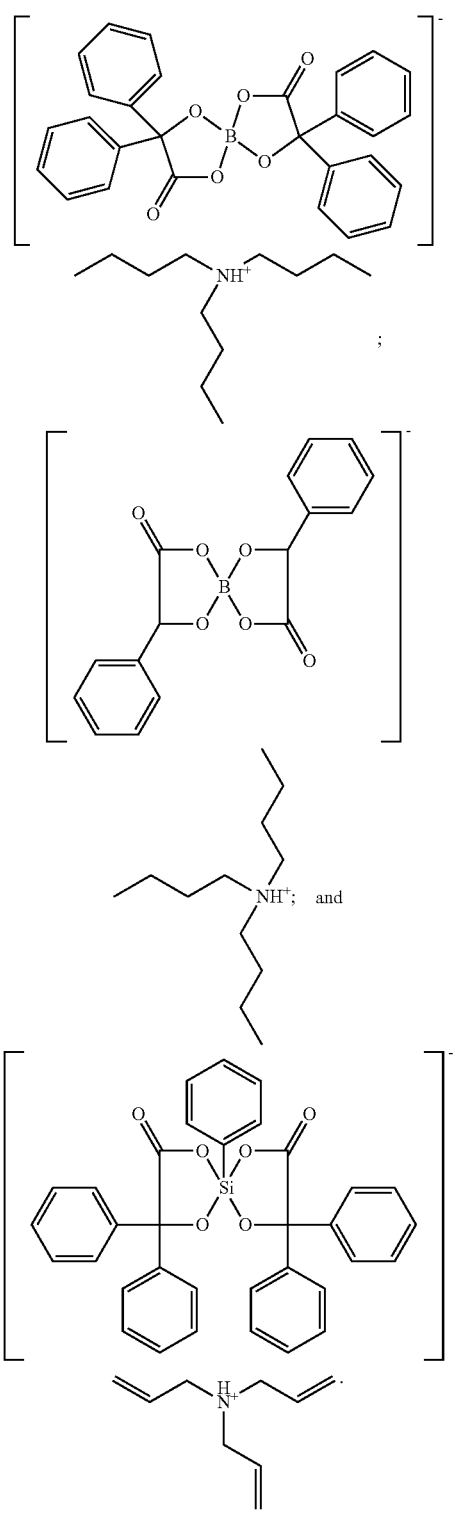

14. A substrate coated with an ink formulation comprising a marking component and reduced indium tin oxide (r-ITO), which r-ITO in powder form has a median particle size in the range from 10 nm to 10 µm, an In:Sn weight ratio less than 12:1, and exhibits a lightness (L*), according to the 1976 CIE (L*, a*, b*) space, of not more than 50, wherein said substrate is selected from paper, cardboard, corrugated paper board, paper board, plastic film, ridged plastic parts, textile, wood, metal, glass, leather, foodstuff, or a solid pharmaceutical composition.

15. The substrate according to claim 14, wherein said ink formulation is covered by a thermoplastic polymer layer in a manner such that the ink formulation is situated between the substrate and the thermoplastic polymer layer and/or in the thermoplastic polymer layer.

16. The substrate according to claim 15, wherein the substrate is selected from paper and paper board.

17. The ink formulation according to claim 1, wherein said reduced indium tin oxide is present in the form of particles with a median particle size less than 250 nm.

18. A liquid food packaging material comprising an innermost thermoplastic layer to be in contact with the liquid food, a substrate coated with an ink formulation comprising a marking component and reduced indium tin oxide (r-ITO), which r-ITO in powder form has a median particle size in the range from 10 nm to 10 µm, an In:Sn weight ratio less than 12:1, and exhibits a lightness (L*), according to the 1976 CIE (L*, a*, b*) space, of not more than 50, wherein said substrate is paper or paper board.

19. A method for marking a substrate coated with an ink formulation comprising a marking component and reduced indium tin oxide (r-ITO), which r-ITO in powder form has a median particle size in the range from 10 nm to 10 µm, an In:Sn weight ratio less than 12:1, and exhibits a lightness (L*), according to the 1976 CIE (L*, a*, b*) space, of not more than 50, wherein said substrate is paper, cardboard, corrugated paper board, paper board, plastic film, ridged plastic parts, textile, wood, metal, glass, leather, foodstuff, or a solid pharmaceutical composition, which method comprises the step of:

irradiating those parts of the coated substrate, where a marking is intended, in order to generate a marking.

20. The method according to claim 19, wherein the substrate is irradiated with a laser, a diode, a fiber coupled diode array system, or a diode array system.

21. The method according to claim 19, wherein said r-ITO in powder form exhibits a lightness (L*), according to the 1976 CIE (L*, a*, b*) space, of at least 20.

22. The method according to claim 19, wherein more than 0 (zero) molar % of the tin in said reduced indium tin oxide (r-ITO), is tin in the zero oxidation state, or more than 25 molar % of the tin in said reduced indium tin oxide (r-ITO), is tin in the zero oxidation state, and/or not more than 75 molar %, of the tin in the reduced indium tin oxide (r-ITO), is tin in the zero oxidation state.

* * * * *